(12) United States Patent
Brassil et al.

(10) Patent No.: US 6,950,668 B2
(45) Date of Patent: Sep. 27, 2005

(54) HIGH DATA RATE COMMUNICATION

(75) Inventors: John Brassil, Los Gatos, CA (US); John Deryk Waters, Bath (GB); Peter J. Macer, Bristol (GB); James Thomas Edward McDonnell, Bristol (GB); Salil Pradhan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 686 days.

(21) Appl. No.: 09/809,427

(22) Filed: Mar. 16, 2001

(65) Prior Publication Data

US 2002/0146067 A1 Oct. 10, 2002

(51) Int. Cl.⁷ .............................. H04B 7/00; H04Q 7/20
(52) U.S. Cl. ..................... 455/517; 455/466; 455/41.2; 455/561
(58) Field of Search ................................ 455/517, 500, 455/466, 41.2, 561, 553.1, 3.05, 3.01, 415, 557; 379/219; 709/219

(56) References Cited

U.S. PATENT DOCUMENTS

| | | | |
|---|---|---|---|
| 5,890,069 A | * | 3/1999 | Evans et al. ................ 455/462 |
| 6,026,297 A | * | 2/2000 | Haartsen ................... 455/426.1 |
| 6,650,871 B1 | * | 11/2003 | Cannon et al. ............ 455/41.2 |
| 2001/0029166 A1 | * | 10/2001 | Rune et al. ................... 455/41 |
| 2002/0039907 A1 | * | 4/2002 | McKenna et al. .......... 455/517 |
| 2002/0059400 A1 | * | 5/2002 | Ikami et al. ................ 709/219 |
| 2002/0098878 A1 | * | 7/2002 | Mooney et al. ............ 455/569 |
| 2002/0132632 A1 | * | 9/2002 | Brassil et al. ............... 455/517 |

FOREIGN PATENT DOCUMENTS

JP  7030573 A2 * 1/1995

* cited by examiner

Primary Examiner—Nay Maung
Assistant Examiner—Edan Orgad

(57) ABSTRACT

A method of transferring high rate data between a first communications device (32) and a second communications device (1) is disclosed. The second communications device (1) has a first transceiver (4) for communication with the first communications device (32) at a first, low data rate over a long range, and a second transceiver (2) for communicating at a second, high data rate over a short range. The method comprises the steps of forming a coordinated short-range network (piconet) using the second communications device (1) and a plurality of other similar communications devices (11, 21), transferring a portion of said data to or from the first communications device (32) from or to each of said second communications device and said other communications devices using their first transceivers (2, 12, 22), and transferring said data portions between said other communications devices and the second communications device using their second transceivers (4, 14, 24).

35 Claims, 1 Drawing Sheet

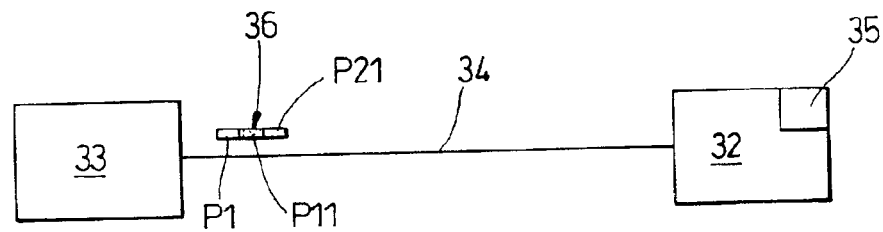
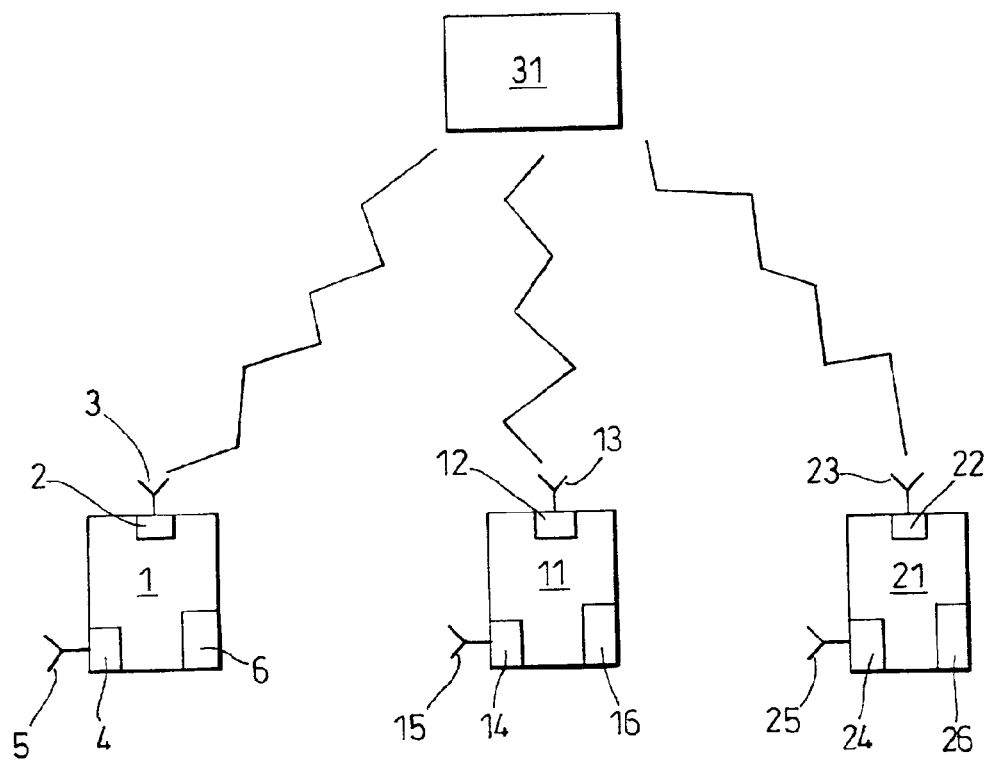

HIGH DATA RATE COMMUNICATION

FIELD OF THE INVENTION

This invention relates to a high data rate communications system and method, and in particular to a method and system to co-ordinate the use of multiple devices' independent, slow-speed, wide area network communications links to create a logical, shareable, high-speed, wide area communications link.

BACKGROUND OF THE INVENTION

It is anticipated that hand-held portable and mobile devices (such as mobile 'phones, laptop computers and personal digital assistance (PDAs)) will have multiple communications interfaces including a short-range, high speed wireless network interface, and a slower-speed, wide area network interface. Thus, such a device may have a short-range, high-speed Bluetooth interface, and a slower-speed cellular telephone interface. Bluetooth is a short-range wireless protocol which operates at 2.45 GHz. Such a short-range wireless network (known as piconet) can support up to eight simultaneous devices, namely one master unit and seven slave units. This type of piconet can dynamically change as users enter and leave the range of the Bluetooth master unit.

Another known short-range wireless protocol is the wireless networking protocol IEEE802.11. Devices constructed in accordance with this protocol operate at 2.45 GHz, and a piconent can support a very large number of users. As with Bluetooth, such a piconet can dynamically change as users enter and leave the piconet.

With either of these two short-range wireless protocols, each member of a piconet can currently communicate outside the piconet at no more than the data transmission rate of a single wide area connection such as a cellular telephony connection or an internet access service (for example a data service for portable computers).

The aim of the invention is to allow members of a piconet to share each others wide area network interface in a co-ordinated fashion to obtain a single, logical, high-speed wide area network connection.

SUMMARY OF THE INVENTION

The present invention provides a method of transferring data between a first communications device and a second communications device, the second communications device having a first transceiver for communication at a first data rate over a long range, and a second transceiver for communicating at a second, higher data rate over a short range, the method comprising the steps of forming a coordinated short-range network (piconet) using the second communications device and a plurality of other similar communications devices, transferring a portion of said data to or from the first communications device from or to each of said second communications device and said other communications device using their first transceivers, and transferring said data portions between said other communications devices and the second communications device using their second transceivers.

Advantageously, each of the second communications device and said other communications devices is a mobile telecommunications device, and the second data rate is higher by an order of magnitude than the first data rate. Preferably, each second transceiver operates in accordance with the wireless networking protocol IEEE802.

In a preferred embodiment, the first transceiver of each of the second communications device and said other communications devices is such as to communicate with the base station of a cellular telecommunications network, and the first communications device is also arranged to communicate with the base station. In this case, the first communications device may include a server which is arranged to instruct the base station to transfer respective data portions to each of said second communications device and said other communications devices. Advantageously, the method further comprises the step of multiplexing said data portions at the second communications device.

Preferably, the server receives a stream of data, conveniently in packets, from a data provider. The server would then independently reconstruct the data stream (if necessary), and re-packetise (if necessary) the data for transmission to the base station.

Advantageously, the server instructs the base station to route each data packet to a respective one of the second communications device and said other communications devices, the totality of the packets routed to a given second or other communications device constituting the data portion transferred to that communications device.

In another preferred embodiment, the second communications device transfers portions of data to be sent to the first communications device to each of a plurality of said other communications devices by means of its second transceiver and their second transceivers, the second communications device instructs said other communications devices to transmit said data portions to the first communications device, and the second communications device transmits the remaining portion of the data to the first communications device.

The invention also provides a data transfer system comprising a first communications device and a plurality of second communications devices, each of the second communications devices having a first transceiver for communication with the first communications device at a first data rate over a long range, and a second transceiver for communicating with other second communications devices at a second, higher data rate over a short range, wherein means are provided for coordinating the second communications devices for transferring data to be communicated between the first communications device and a given second communications device so that a respective portion of said data is transferred between each of said second communications devices and the first communications device using the first transceivers of said second communications devices, and transferring said data portions between said second communications devices using their second transceivers.

The invention will now be described in greater detail by way of example, with reference to the accompanying drawing, the single figure of which is a schematic representation of a high data rate communications system constructed in accordance with the invention.

DETAILED DESCRIPTION OF THE DRAWING

Referring to the drawing, a piconet is constituted by the handsets 1, 11 and 21 of the user of three mobile phones. The handset 1 includes a low speed (typically 100 kilobits/sec) transceiver 2 and an aerial 3 for communication with the base station 31 of a cellular mobile telecommunications network. The handset 1 also includes a low-speed transceiver 4 (typically 1,000 to 11,000 kilobits/sec) and an aerial 5 for communication with the handsets 11 and 21 (and with the handset of any other user which enters the piconet). The piconet uses the wireless networking protocol IEEE802.11, and so can accommodate a large number of users. The handset 1 also includes a processor 6 which is programmed in the manner described below.

Similarly, the handsets 11 and 21 include high-speed (typically 1,000 to 11,000 kilobits/sec) transceivers 12 and 22, aerials 13 and 23, transceivers 14 and 24, aerials 15 and 25, and processors 16 and 26 respectively. The transceivers 2, 12 and 22 are slow-speed (typically 100 kilobits/sec) cellular telephone transceivers, which are incapable of supporting high-speed data communications such as video streaming.

A service provider 32 is provided for handling the provision of a high data rate service such as video streaming. The content for this service is provided by a server 33 linked to the service provider 32 by a line 34. The service provider 32 contains a processor 35 which controls the provision of the high data rate service to the base station 31.

In the embodiment being described, more than three users would be needed to provide a reliable video streaming service. The principle of providing such a service is, however, the same no matter how many users are coordinated (in the manner described below) in the piconet.

Thus, assuming that the user of the handset 1 wants to be provided with a high data rate service which cannot be carried by the slow-speed communications link provided by the cellular mobile telecommunications network, the handset uses its programmed processor 6 to initiate a call to the service provider 32, via the base station 31 over the slow-speed communications link, from itself and the handsets 11 and 21. The address of the service provider 32 would be provided to the handsets 11 and 21 by the processor 6 of the handset 1.

Assuming that the handsets 11 and 21 have the facility to enter the co-ordinated system, the service provider 32 then requests the server 33 to send the high data rate service over the line 34 in a stream of packets intended eventually for the handsets 1, 11 and 21 respectively. As shown, a part 36 of the stream has three packets labelled P1, P11 and P21 respectively. The service provider 32 then independently reconstructs the stream (if necessary), and re-packetises the data (if necessary) 11. It then transmits the packets to the base station 31 with instructions to route the packets P1 to the handset 1, the packets P11 to the handset 11 and the packets P21 to the handset 21. Upon arrival at the handsets 11 and 21, the received data is retransmitted over the short-range, high-speed network using the transceivers 14 and 24 and the aerials 5 and 25 to the handset 1. The handset 1 then re-multiplexes the data arriving from the base station 31 and the handsets 11 and 21 to recreate the original high data rate service.

Where video streaming is required, a larger number N of piconet users will need to be used. The principle of operation is, however, the same. Thus, the service is implemented in part by the service provider 32 which sets up the co-ordination of the handsets of the N users. The service provider 32 then instructs the server 33 to transmit a video stream at a transmission rate of up to N times higher than the data transmission rate of each cellular network connection. The service provider 32 de-multiplexes the arriving high rate video stream, and instructs the base station 31 to place 1/Nth of the arriving traffic (that is to say the packets) on each of the N cellular connections. Upon arrival at each of the handsets (except that requesting the video streaming service), the received data is retransmitted over the short-range, high-speed wireless network. The requesting handset then re-multiplexes the data arriving from the base station 31 and the other handsets to recreate the original high data rate service.

In a modified arrangement, if all N users of the piconet wish to receive the video stream, on reception of its 1/Nth of the packets, each handset retransmits that data over the short-range, high-speed network. Each of the handsets then receives and re-multiplexes data arriving on the short-range high-speed wireless network to recreate the original, high-rate video stream. The original stream can then be rendered and displayed on each handset.

The invention can also be used to transmit data at a high rate from an individual user. Thus, if the user of a given handset wishes to up-load data outside the piconet at high speed, that handset uses its programmed processor 6 to generate an advertisement protocol to identify a set of K-1 handsets in the piconet willing to offer use of their wide area network connections. The given handset then transmits 1K/th of the data it requires to upload to each of the K-1 participating handsets over the short-range, high-speed wireless network, and 1/Kth of the data directly to the base station 31. Upon arrival at each participating handset, the received data is retransmitted by that handset over its slow-speed cellular network connection. The data transmitted by the K-1 handsets is then re-multiplexed at a remote point, for example a server associated with the base station 31. Alternatively, re-multiplexing is carried out at the data destination itself It would also be possible to modify the method of the invention to operate with a different wireless networking protocol such as Bluetooth. In this case, where one or more piconet users require downloading of data, each of their handsets will be programmed to retransmit data received from the service provider 32 via the base station 31 to the Bluetooth master unit, which will then retransmit all the data to the each of the handsets requiring that data. Similarly, if a user wants to upload data at a high data rate, that user transmits 1/Kth of the data to each of the participating handsets via the Bluetooth master unit of the piconet.

When the handsets in the piconet are registered with different cellular mobile networks, uploading and downloading of data will take place via the relevant base station of each of those networks. Accordingly, references throughout this specification to "the base station" should be construed as including the base station of each cellular mobile network associated with given piconet.

In a further modification of the invention, the use of adaptive bandwidth-aware applications (example layered video coding schemes) can be exploited to make best use of instantaneous bandwidth. For example, a streaming video application might detect the loss of half of the coordinated members of a piconet, and would then reduce the video quality to a level requiring half the original bandwidth.

There are also many additional techniques which can be used to supplement the invention, such as encoding the data to improve reliability (known as diversity routing).

Although the system described above specifically refers to mobile 'phone handsets and to a cellular mobile telecommunications network, it will be appreciated that the invention is also applicable to other forms of communications devices and other wide area network services.

What is claimed is:

1. A method of transferring data between a first communications device and a second communications device, using a plurality of other communications devices, the second communications device and the other communications devices having a first transceiver for communication at a first data rate over a long range, and a second transceiver for communicating at a second, higher data rate over a short range, the method comprising the steps of forming a coordinated short-range network using the second communications device and the plurality of other communications devices, transferring a portion of said data from the first communications device to said second communications device and each of said other communications devices using the first transceivers of the other communications devices, and transferring said data portions received by said other communications devices to the second communications device using the second transceivers of the other communications devices.

2. A method as claimed in claim 1, wherein each of the second communications device and said other communications devices is a mobile telecommunications device.

3. A method as claimed in claim 1, wherein the second data rate is higher than the first data rate by a factor of two or more.

4. A method as claimed in any one of claims 1, wherein each second transceiver operates in accordance with the wireless networking protocol IEEE802.

5. A method as claimed in any one of claims 1, wherein the first transceiver of the second communications device and each of said other communications devices is such as to communicate with a base station of a cellular telecommunications network, and wherein the first communications device is also arranged to communicate with the base station.

6. A method as claimed in claim 5, wherein the first communications device includes a server which is arranged to instruct the base station to transfer separate data portions to said second communications device and each of said other communications devices.

7. A method as claimed in claim 6, further comprising the step of multiplexing said data portions at the second communications device.

8. A method as claimed in claim 7, wherein the server requests a stream of data from a data provider in packets, and the server instructs the base station to route each data packet to a respective one of the second communications device and said other communications devices, the totality of the packets routed to a given second or other communications device constituting the data portion transferred to that communications device.

9. A data transfer system comprising a first communications device and a plurality of second communications devices, each of the second communications devices having a first transceiver for communication with the first communications device at a first data rate over a long range, and a second transceiver for communicating with other second communications devices at a second, higher data rate over a short range, wherein means are provided for coordinating the second communications devices for transferring data to be communicated between the first communications device and a given second communications device so that a respective portion of said data is transferred between each of said second communications devices and the first communications device using the first transceivers of said second communications devices, and transferring said data portions between said second communications devices using their second transceivers.

10. A system as claimed in claim 9, wherein each of the second communications devices is a mobile telecommunications device.

11. A system as claimed in claim 9, wherein the transceivers are such that the second data rate is higher than the first data rate by a factor of two or more.

12. A system as claimed in claim 9, wherein each second transceiver operates in accordance with the wireless networking protocol IEEE802.

13. A system as claimed in any one claims 9, further comprising a base station of a cellular telecommunications network, the first transceivers of the second communications devices being arranged to communicate with the base station, and the first communications device being provided with a transceiver for communication with the base station.

14. A system as claimed in claim 13, wherein the first communications device further comprises a server which is arranged to instruct the base station to transfer respective data portions to each of the second communication devices.

15. A system as claimed in claim 14, wherein a given second communications device comprises means for multiplexing all said data portions.

16. A system as claimed in claim 14, further comprising a data provider for sending data to the server in packets, the server being such as to instruct the data provider to label each data packet for transmission by the base station to a respective one of the second communications devices, the totality of the packets labeled for a given second communications device constituting the data portion transferred to that communications device.

17. A system as claimed in any one of claims 9, wherein a given second communications device is arranged to transfer portions of data to be sent to the first communications device to each of a plurality of the other second communications devices by means of its second transceiver and their second transceivers, the given second communications device being such as to instruct said other second communications devices to transmit said data portions to the first communications device, and being such as to transmit the remaining portion of the data to the first communications device.

18. A method of transferring bandwidth to and from a communications device having first and second transceivers, the first transceiver being a long-range, low data rate transceiver, and the second transceiver being a short-range, high data rate transceiver, the method comprising utilising the first and second transceivers of similar communications devices situated within a short-range network served by the second transceivers of the communications devices, the data to be transferred to or from said communications device being transferred in portions between the communications devices using the second transceivers, and to and from a further communications device using the first transceivers of the communications devices.

19. A method of transferring data between a second communications device and a first communications device using a plurality of other communications devices, the second communications device and the other communications devices each having a first transceiver for communication at a first data rate over a long range, and a second transceiver for communicating at a second higher data rate over a short range, the method comprising the steps of forming a coordinated short range network using the second communications device and the plurality of other communications devices, transferring portions of said data from the second communications device to said other communications devices using the second transceivers of the other communications devices; and the second communications devices and the other communications devices transferring said data portions to the first communications device using the first transceivers of the other communications devices.

20. A method as claimed in claim 19, wherein the second communications device and each of said other communications devices is a mobile telecommunications device.

21. A method as claimed in claim 19, wherein the second data rate is higher than the first data rate by a factor of two or more.

22. A method as claimed in claim 19, wherein each second transceiver operates in accordance with the wireless networking protocol IEEE802.

23. A method as claimed in claim 19, wherein the first transceiver of the second communications device and each of said other communications devices is such as to communicate with the base station of a cellular telecommunications network, and wherein the first communications device is also arranged to communicate with the base station.

24. A method as claimed in claim 19, wherein the second communications device transfers portions of data to be sent to the first communications device to each of the other communications devices by using its second transceiver and the second transceivers of the other communications devices, the second communications device instructs said other communications devices to transmit said data portions to the first communications device, and the second communications device transmits the remaining portion of the data to the first communications device.

25. A method of enabling a second communications device to receive data at a higher rate from a first communications device, the second communications device having a first transceiver for communicating at a first data rate over a long range and a second transceiver for communicating at a second, higher data rate over a short range, the method comprising the steps of:

obtaining the addresses of other communications devices in a short-range network with the second communications device and communicating with the second communications device by its second transceiver wherein said other communications devices are prepared to relay data between the first communications device and the second communications device;

notifying the first communications device of the addresses of the other communications devices, and requesting data to be provided to the other communications devices to be relayed to the second communications device; and receiving portions of the data from the other communications devices and assembling the portions to form the requested data.

26. A method as claimed in claim 25, wherein the step of requesting data further comprises requesting a portion of the data to be sent directly to the first transceiver of the second communications device.

27. A method as claimed in claim 25, wherein the second communications device is a mobile telecommunications device.

28. A method as claimed in claim 25, wherein the second data rate is higher than the first data rate by a factor of two or more.

29. A method as claimed in claim 25, wherein the second transceiver operates in accordance with the wireless networking protocol IEEE802.

30. A method of enabling a second communications device to send data at a higher data rate to a first communications device, the second communications device having a first transceiver for communicating at a first data rate over a long range and a second transceiver for communicating at a second, higher data rate over a short range, the method comprising the steps of:

determining that other communications devices that are (a) in a short-range network with the second communications device and (b) communicating with the second communications device by its second transceiver, are prepared to relay data between the first communications device and the second communications device; and sending portions of the data to said other communications devices such that each of the portions of the data are indicated to be for onward transmission to the first communications device.

31. A method as claimed in claim 30, wherein the step of sending portions of the data further comprises sending a portion of the data to the first communications device through the first transceiver.

32. A method as claimed in claim 30, wherein the second communications device is a mobile telecommunications device.

33. A method as claimed in claim 30, wherein the second data rate is higher than the first data rate by a factor of two or more.

34. A method as claimed in claim 30, wherein the second transceiver operates in accordance with the wireless networking protocol IEEE802.

35. A method of transferring data between a first communications device and a second communications device using a plurality of other communications devices, the second communications device having a first transceiver for communication at a first data rate over a long range, and a second transceiver for communicating at a second, higher data rate over a short range, the method comprising the steps of:

forming a coordinated short-range network using the second communications device and the plurality of other communications devices;

transferring a portion of said data to or from the first communications device from or to said second communications device and said other communications devices using the first transceivers of the other communications devices and transferring said data portions between said other communications devices and the second communications device using the second transceivers of the other communications devices, the first transceiver of the second communications device and each of said other communications devices being such as to communicate with a base station of a cellular telecommunications network, the first communications device also being arranged to communicate with the base station, the first communications device including a server which is arranged to instruct the base station to transfer respective data portions to each of said second communications device and said other communications devices; and multiplexing said data portions at the second communications device, the server requesting a stream of data from a data provider in packets, and the server instructing the base station to route each data packet to a respective one of the second communications device and said other communications devices, the totality of the packets routed to a given second or other communications device constituting the data portion transferred to that communications device.

* * * * *

UNITED STATES PATENT AND TRADEMARK OFFICE
CERTIFICATE OF CORRECTION

| | |
|---|---|
| PATENT NO. | : 6,950,668 B2 |
| APPLICATION NO. | : 09/809427 |
| DATED | : September 27, 2005 |
| INVENTOR(S) | : Brassil et al. |

It is certified that error appears in the above-identified patent and that said Letters Patent is hereby corrected as shown below:

In Column 1, Line 30, delete "piconent" and insert -- piconet --, therefor.

In Column 2, Line 64, delete "low-speed" and insert -- high speed --, therefor.

In Column 3, Lines 5-12, delete "Similarly, the ......................such as video streaming." and insert -- Similarly, the handsets 11 and 21 include low-speed (typically 100 kilobits/sec) transceivers 12 and 22, aerials 13 and 23, high-speed transceivers 14 and 24 (typically 1,000 to 11,000 kilobits/sec), aerials 15 and 25, and processors 16 and 26 respectively. The transceivers 2, 12 and 22 being slow-speed cellular telephone transceivers, are incapable of supporting high-speed data communications such as video streaming. --, therefor.

In Column 4, Line 28, delete "itself" and insert -- itself. --, therefor.

In Column 4, Line 41, delete "piconent" and insert -- piconet --, therefor.

In Column 5, Line 14, in Claim 2, delete "wherein each of" and insert -- wherein --, therefor.

In Column 5, Line 15, in Claim 2, delete "and said" and insert -- and each of said --, therefor.

In Column 5, Line 20, in Claim 4, delete "any one of claims" and insert -- claim --, therefor.

In Column 5, Line 23, in Claim 5, delete "any one of claims" and insert -- claim --, therefor.

In Column 6, Line 24, in Claim 17, delete "any one of claims" and insert -- claim --, therefor.

In Column 6, Line 64, Claim 20, delete "claimed in claimed in" and insert -- claimed in --, therefor.

Signed and Sealed this
Sixth Day of November, 2012

David J. Kappos
*Director of the United States Patent and Trademark Office*